(12) United States Patent
Ko

(10) Patent No.: US 8,532,821 B2
(45) Date of Patent: Sep. 10, 2013

(54) AUTOMATIC VEERING STRUCTURE FOR FLOOR CLEANING APPARATUS

(76) Inventor: Joseph Y. Ko, Irvine, CA (US)

( * ) Notice: Subject to any disclaimer, the term of this patent is extended or adjusted under 35 U.S.C. 154(b) by 462 days.

(21) Appl. No.: 12/881,716

(22) Filed: Sep. 14, 2010

(65) Prior Publication Data

US 2012/0065830 A1 Mar. 15, 2012

(51) Int. Cl.
G05D 1/00 (2006.01)

(52) U.S. Cl.
USPC ........... 700/258; 700/245; 700/253; 700/255; 318/568.12; 901/1; 901/46; 15/325

(58) Field of Classification Search
USPC ................... 701/26; 700/245, 253, 255, 258; 901/1, 46, 49; 318/568.12; 15/325
See application file for complete search history.

(56) References Cited

U.S. PATENT DOCUMENTS

| 5,446,445 | A  | * | 8/1995  | Bloomfield et al. | 340/521  |
|-----------|----|---|---------|-------------------|----------|
| 6,999,850 | B2 | * | 2/2006  | McDonald          | 700/245  |
| 7,004,269 | B2 | * | 2/2006  | Song et al.       | 180/6.5  |
| 7,441,298 | B2 | * | 10/2008 | Svendsen et al.   | 15/49.1  |
| 7,636,982 | B2 | * | 12/2009 | Jones et al.      | 15/319   |
| 7,643,906 | B2 | * | 1/2010  | Yu et al.         | 700/255  |
| 2004/0143930 | A1 | * | 7/2004  | Haegermarck    | 15/358   |
| 2008/0140255 | A1 | * | 6/2008  | Ziegler et al. | 700/245  |
| 2008/0307590 | A1 | * | 12/2008 | Jones et al.   | 15/21.1  |
| 2009/0007366 | A1 | * | 1/2009  | Svendsen et al.| 15/319   |
| 2009/0045766 | A1 | * | 2/2009  | Casey et al.   | 318/568.16 |
| 2010/0037418 | A1 | * | 2/2010  | Hussey et al.  | 15/319   |
| 2010/0133022 | A1 | * | 6/2010  | Chung et al.   | 180/21   |
| 2011/0004339 | A1 | * | 1/2011  | Ozick et al.   | 700/245  |

FOREIGN PATENT DOCUMENTS

TW M377197 U1 4/2010

* cited by examiner

*Primary Examiner* — Thomas Black
*Assistant Examiner* — Peter D Nolan
(74) *Attorney, Agent, or Firm* — Muncy, Geissler, Olds & Lowe, PLLC

(57) ABSTRACT

An automatic veering structure for a floor cleaning apparatus comprises a driving wheel set to control moving direction of the floor cleaning apparatus, an auxiliary wheel set and a buffer module. It also has a detection module to detect whether the auxiliary wheel set is suspended in the air and whether the buffer module bumps into an obstacle, then output a first detection signal and a second detection signal to a control module to determine whether to trigger the driving wheel set to drive the floor cleaning apparatus to veer to prevent the floor cleaning apparatus from suspending and falling, or stopping moving when encounters the obstacle. Thus the lifespan of the floor cleaning apparatus is lengthened and cleaning efficiency improves.

7 Claims, 7 Drawing Sheets

AUTOMATIC VEERING STRUCTURE FOR FLOOR CLEANING APPARATUS

FIELD OF THE INVENTION

The present invention relates to an automatic veering structure for a floor cleaning apparatus and particularly to an automatic veering structure to allow a floor cleaning apparatus to veer automatically upon encountering obstacles.

BACKGROUND OF THE INVENTION

With continuous increase of living standard, people pay more and more attention to house cleaning. In general, mop is the most widely used cleaning tool to clean a floor. However, aside from conventional manual cleaning tools, rapid advance of technology has spawned automatic cleaning apparatus that does not need manual operation.

For instance, R.O.C. patent No. M377197 discloses a releasing system for an automatic cleaning robot comprising a body which is an automatic cleaning robot with a self-moving control logic containing an action control unit held therein. The action control unit is an electronic element assembly to control body movements through a logic setting. The body has a movable means located at the bottom thereof that is electrically connected to the action control unit and driven to control body movements, and at least one auxiliary wheel located at the bottom of the body to incorporate with the movable means to support the body in an upright manner and keep the body moving steady. The auxiliary wheel has two side walls with at least one hole formed thereon to intermittently cover light between the side walls during rotation thereof. The body also has a detecting assembly which includes a signal sending element and a corresponding signal receiving element that are electronic elements to transmit signals through a specific light source and located at two sides of the auxiliary wheel corresponding to the hole. When the auxiliary wheel rotates, the signal sending element sends a light signal to pass through the hole of the auxiliary wheel and intermittently transmit to the signal receiving element. The signal receiving element is electrically connected to the action control unit of the body. In the event that the body encounters an obstacle and cannot move forwards, the auxiliary wheel which is not mechanically driven remains still without rotating due to the body is not moving, hence light transmission between the signal sending and receiving elements is interrupted due to stop of rotation of the auxiliary wheel. This serves as the basis to judge the body being stopped without moving. Then a backward moving command is issued to relieve the body from the dilemma.

The previous technique uses "whether the signal receiving element receives an intermittent signal" as the judgment basis, thus it requires a full stop of the auxiliary wheel to make the judgment. However, the auxiliary wheel does not stop instantly in some special conditions, for instance, when the auxiliary wheel moves to a stairway and suspends, it continuously rotates for a while before stops, or when the cleaning apparatus bumps into an obstacle, the auxiliary wheel first reverses before rotating forwards and does not stop until the impact force has been fully absorbed. In these situations, the cleaning apparatus cannot make a correct judgment instantly when it encounters an abrupt condition, and veering timing is delayed. This could cause falling or damage of the cleaning apparatus.

SUMMARY OF THE INVENTION

The primary object of the present invention is to solve the aforesaid disadvantages and let a cleaning apparatus to veer instantly when encounters an abrupt situation to avert damage.

To achieve the foregoing object, the invention provides an automatic veering structure for a floor cleaning apparatus that includes a driving wheel set and an auxiliary wheel set located on the floor cleaning apparatus. The driving wheel set controls moving direction of the floor cleaning apparatus. The auxiliary wheel set has a wheel rack hinged on the floor cleaning apparatus. The wheel rack has a wheel rolling on the floor and a first actuation portion. When the wheel is not in contact with the floor and suspends in the air, the wheel rack can drive the wheel and first actuation portion to generate a swivel displacement against the floor cleaning apparatus. The floor cleaning apparatus also has a buffer module at the front side that has a buffer member. The buffer member has a second actuation portion extended therefrom. When the buffer member bumps into an obstacle during moving of the floor cleaning apparatus, the second actuation portion is pushed by the obstacle and driven to generate a moving displacement relative to the floor cleaning apparatus. The floor cleaning apparatus further has a detection module to detect the swivel displacement of the first actuation portion and the moving displacement of the second actuation portion to determine whether the floor cleaning apparatus is suspended or bumps into an obstacle, and output a first detection signal and a second detection signal to a control module to determine whether to trigger the driving wheel set to veer the floor cleaning apparatus.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
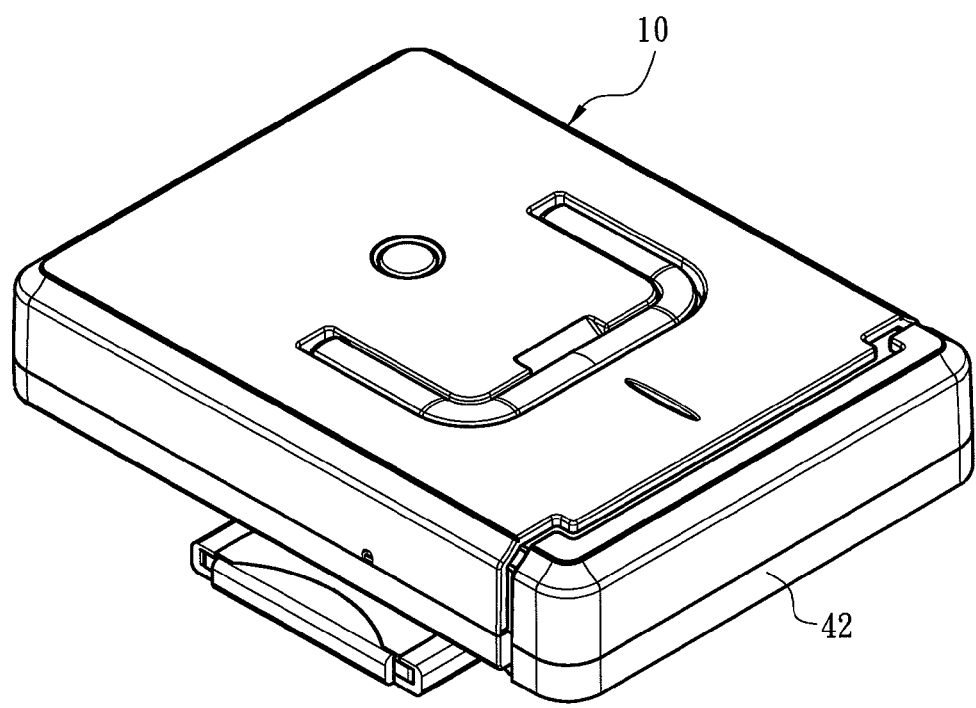
FIG. 1 is a perspective view of the invention.
Figure 2:
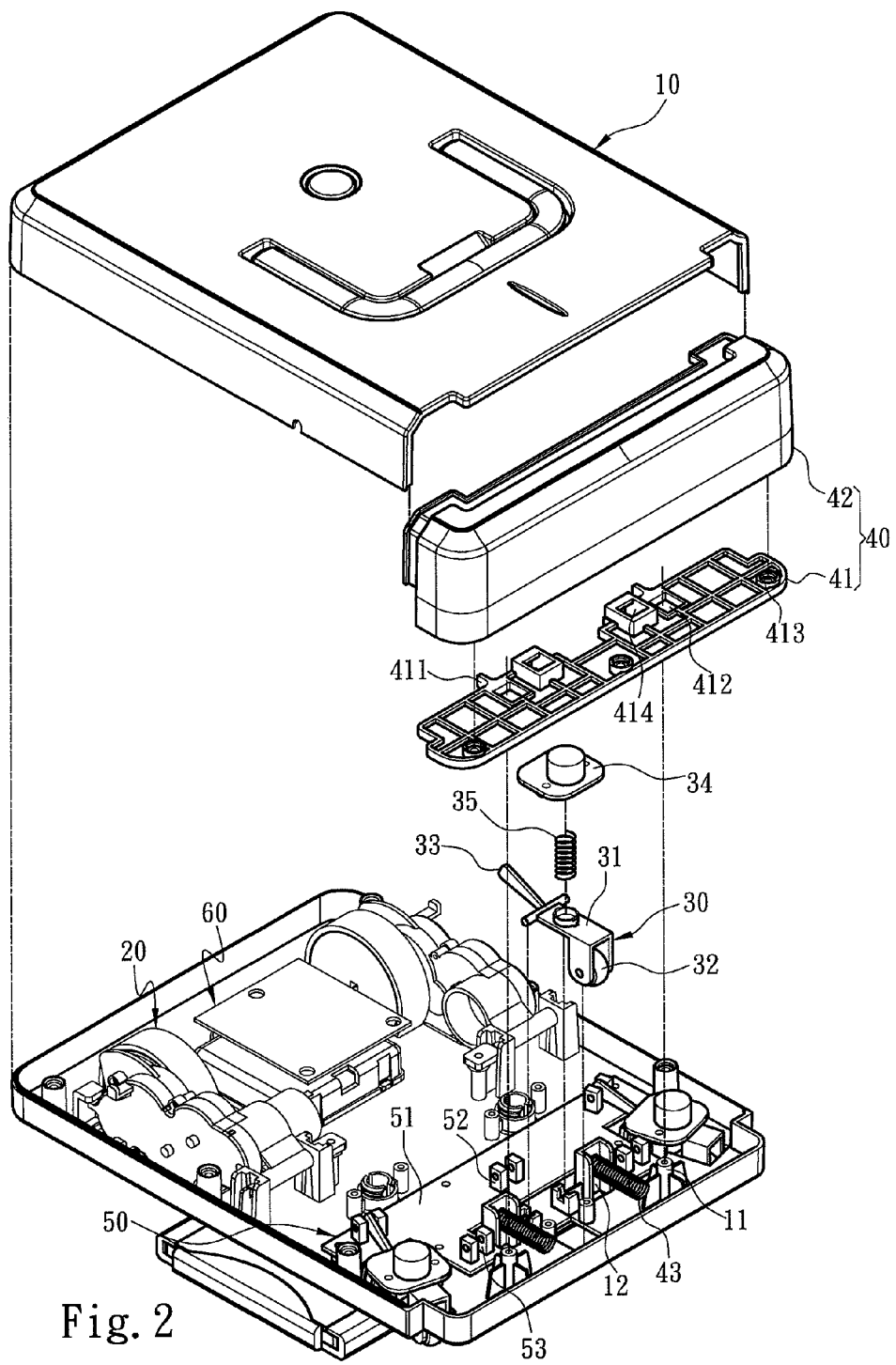
FIG. 2 is an exploded view of the invention.

Please refer to FIGS. 1 and 2, the present invention aims to provide an automatic veering structure for a floor cleaning apparatus. It comprises a driving wheel set 20, an auxiliary wheel set 30, a buffer module 40, a detection module 50 and a control module 60. The driving wheel set 20 is located on a floor cleaning apparatus 10 to control moving direction thereof. The auxiliary wheel set 30 has a wheel rack 31 hinged on the floor cleaning apparatus 10. The wheel rack 31 includes a wheel 32 rolling on the floor and a first actuation portion 33. The wheel rack 31 drives the wheel 32 and first actuation portion 33 to generate a swivel displacement against the floor cleaning apparatus 10. In addition, the floor cleaning apparatus 10 also has a cap 34 located above the wheel rack 31. The cap 34 has a housing space 341 (referring to FIG. 3A) to hold an elastic element 35. The elastic element 35 has two ends butting the cap 34 and wheel rack 31 so that the wheel 32 is pressed downwards to rest on the floor in a normal condition.

The buffer module 40 has a buffer member at the front side of the floor cleaning apparatus 10. The buffer member includes a movable board 41 located on the floor cleaning apparatus 10 and a blocking board 42 located on the movable board 41. The movable board 41 has a second actuation portion 411 extended therefrom. In the drawings of the invention, the floor cleaning apparatus 10 has a holding strut 11 and the movable board 41 has movable hole 412 to hold the holding strut 11. The movable board 41 further has an anchor hole 413 and the blocking board 42 has an anchor strut 421 held in the anchor hole 413 (referring to FIG. 3A). The floor cleaning apparatus 10 and the movable board 41 also have respectively a holding trough 12 and 414 corresponding to each other. The holding troughs 12 and 414 have respectively an insertion portion 13 and 415. The movable board 41 and floor cleaning apparatus 10 are interposed by a bracing member 43 which has two ends held in the holding troughs 12 and 414 and inserted in the insertion portions 13 and 415 so that the blocking board 42 is supported at a front position in the normal condition. Therefore, in the event that the buffer member is pushed by an obstacle, the second actuation portion 411 is driven to generate a moving displacement against the floor cleaning apparatus 10.

The detection module 50 includes a baseboard 51 to hold a first detector 52 to detect the first actuation portion 33 and a second detector 53 to detect the second actuation portion 411 that mainly aim to detect the swivel displacement of the first actuation portion 33 and the moving displacement of the second actuation portion 411, and output a corresponding first detection signal and a corresponding second detection signal. The first and second detectors 52 and 53 are optical sensors. The control module 60 is a circuit board electrically connected to the detection module 50 to obtain the first and second detection signals to determine whether to trigger the driving wheel set 20 to drive the floor cleaning apparatus 10 to veer. Thus forms the main structure of the invention.

Figure 3A:
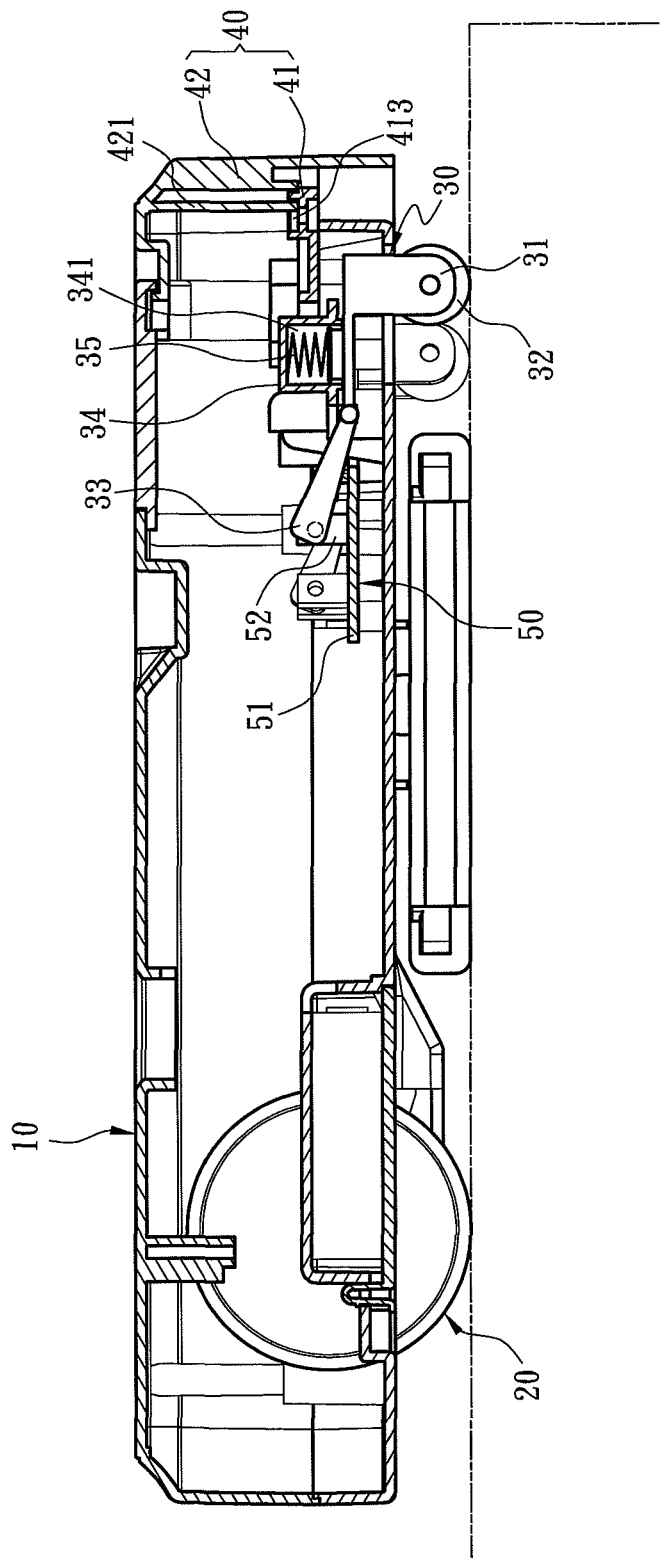
FIGS. 3A and 3B are schematic views of the invention in a use condition.
Figure 3B:
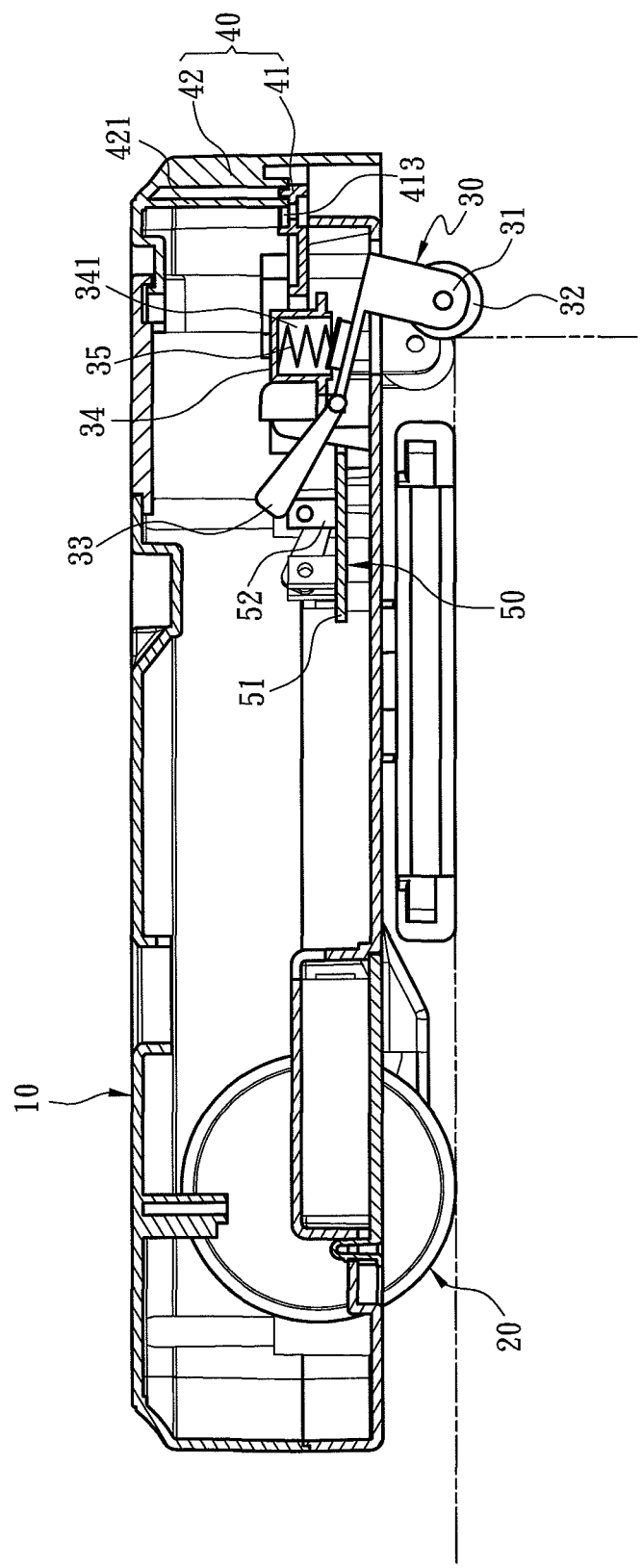

Referring to FIGS. 3A and 3B, when the floor cleaning apparatus 10 is moving on the floor, the wheel 32 of the auxiliary wheel set 30 rests on the floor and the wheel rack 31 compresses the elastic element 35 upwards, at this time, the first actuation portion 33 is located in the first detector 52 (referring to FIG. 3A). In the event that the auxiliary wheel set 30 moves to an area where a different elevation exists, such as a stairway, the wheel 32 is removed from the floor and the elastic element 35 butts the wheel rack 31 to drive the wheel 32 and the first actuation portion 33 to generate a swivel displacement, and the first actuation portion 33 escapes from the first detector 52 (referring to FIG. 3B); then the first detector 52 outputs the first detection signal to the control module 60 to trigger the driving wheel set 20 to drive the floor cleaning apparatus 10 to veer and prevent the floor cleaning apparatus 10 from falling and being damaged.

Figure 4A:
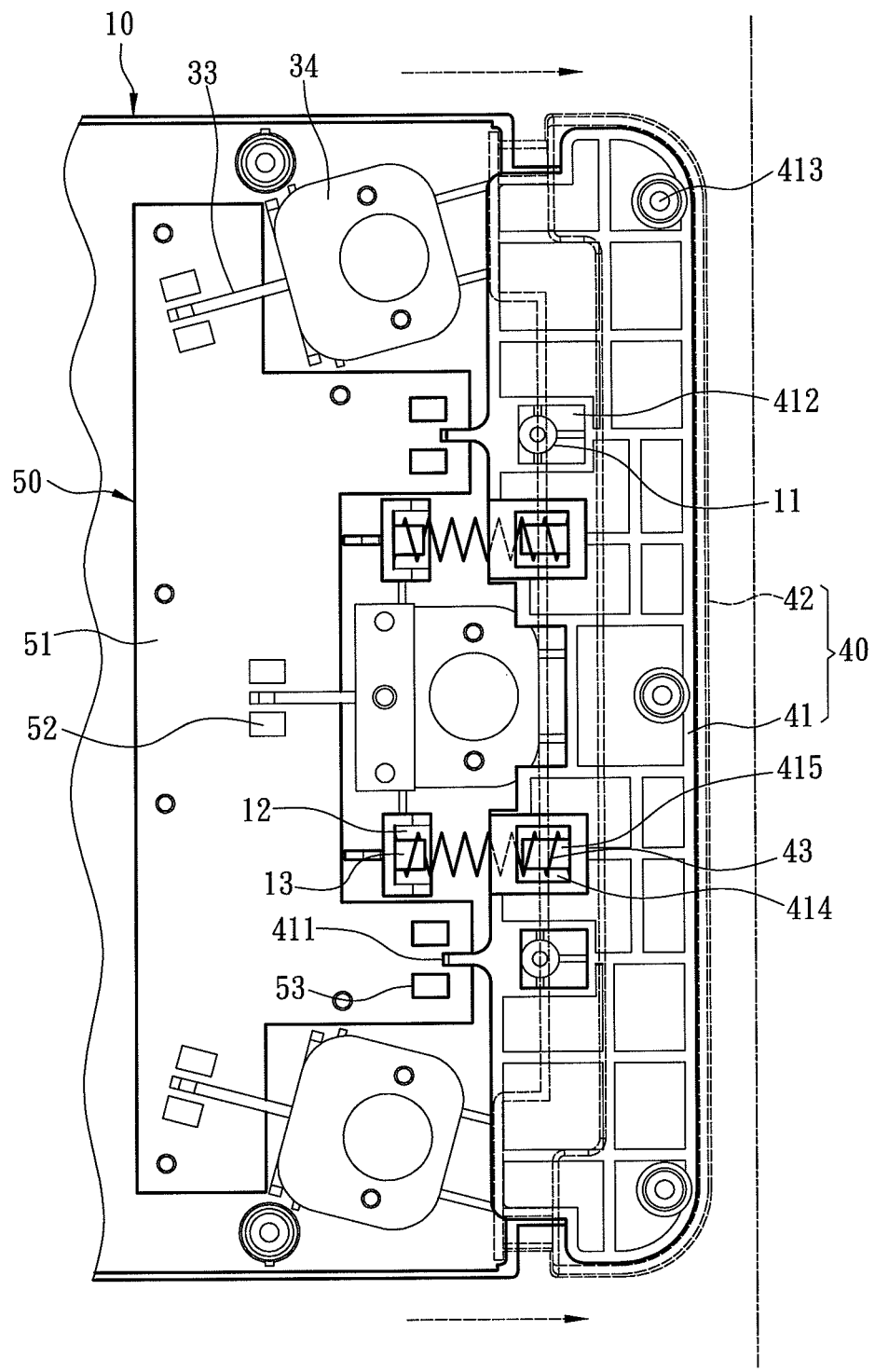
FIGS. 4A and 4B are schematic views of the invention in another use condition.
Figure 4B:
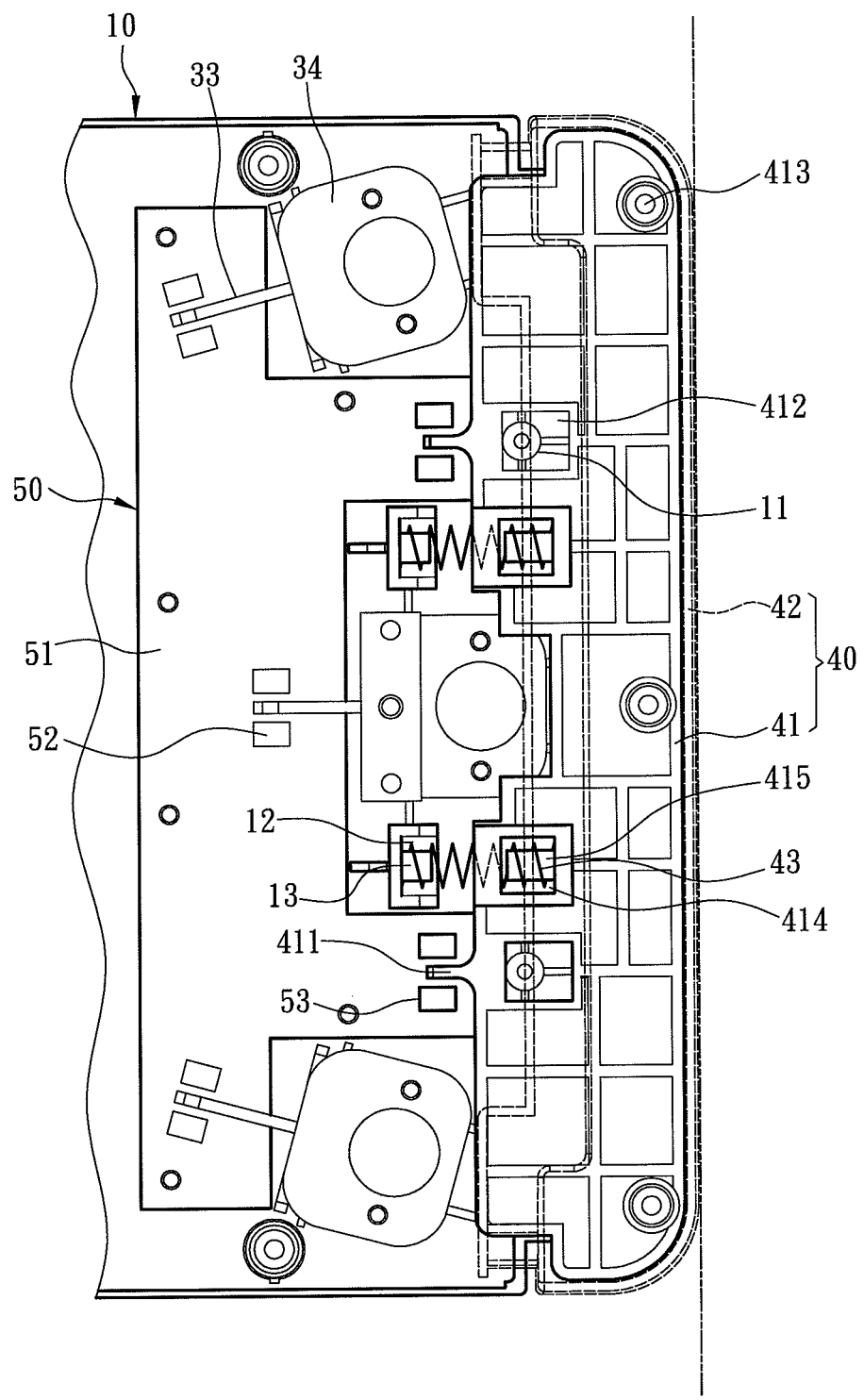

Referring to FIGS. 4A and 4B, when the floor cleaning apparatus 10 is moving on the floor, the movable board 41 and blocking board 42 of the buffer module 40 are supported by the bracing member 43 at the front side, and the second actuation portion 411 is removed from the second detector 53 (referring to FIG. 4A). In the event that the blocking board 42 bumps into an obstacle, such as a wall, the blocking board 42 and movable board 41 are pushed by the obstacle to compress the bracing member 43 and drive the second actuation portion 411 to generate the moving displacement and moved in the second detector 53 (referring to FIG. 4B); then the second detector 53 outputs the second detection signal to the control module 60 to trigger the driving wheel set 20 to drive the floor cleaning apparatus 10 to veer and prevent the floor cleaning apparatus 10 from leaning against the obstacle.

Figure 5:
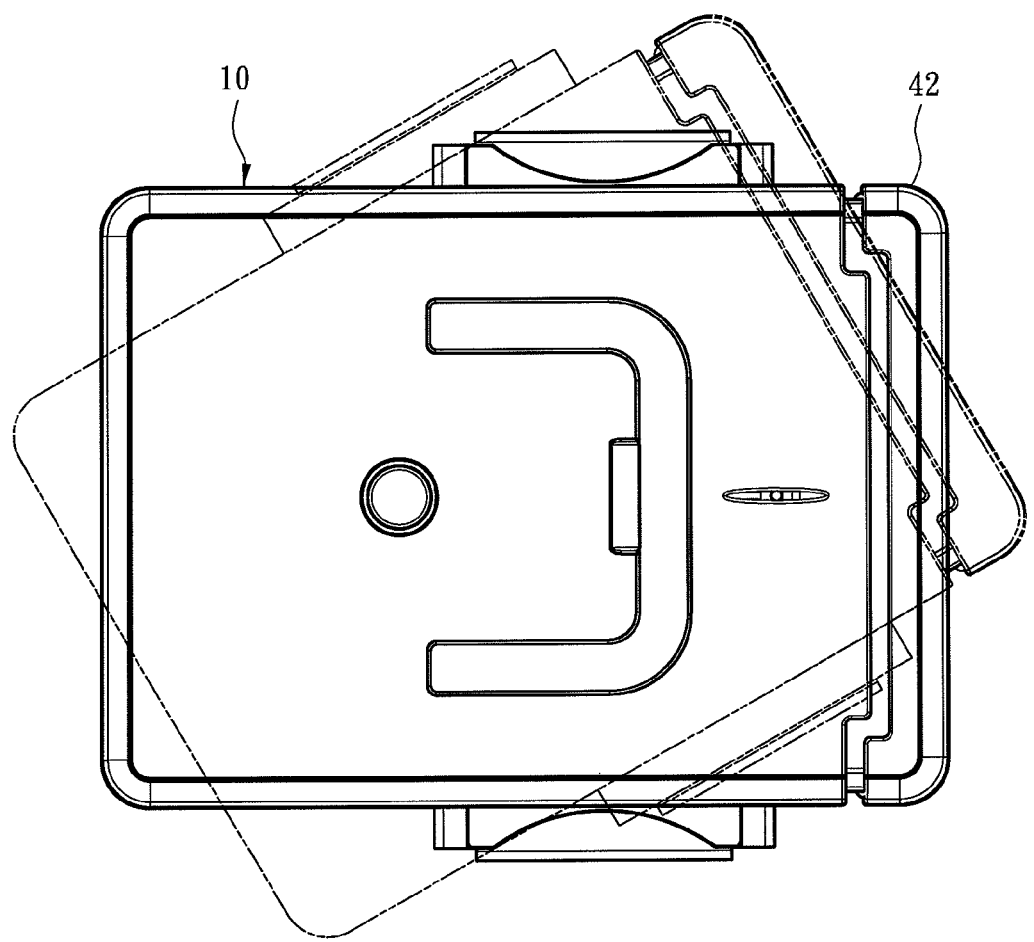
FIG. 5 is a schematic view of the invention in a veering condition.

As a conclusion, the detection module 50 of the invention mainly detects whether the floor cleaning apparatus 10 is suspended through the auxiliary wheel set 30, and detects whether the floor cleaning apparatus 10 bumps into an obstacle through the buffer module 40, and outputs a first detection signal or a second detection signal to the control module 60 to make the floor cleaning apparatus 10 to veer at the same place as shown in FIG. 5.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An automatic veering structure for a floor cleaning apparatus, comprising:
    a driving wheel set located on the floor cleaning apparatus to control moving direction of the floor cleaning apparatus;
    an auxiliary wheel set including a wheel rack hinged on the floor cleaning apparatus, the wheel rack including a wheel rolling on a floor and a first actuation portion, and the wheel rack driving the wheel and the first actuation portion to generate a swivel displacement against the floor cleaning apparatus;
    a buffer module including a buffer member at a front side of the floor cleaning apparatus, the buffer member including a second actuation portion extended therefrom and being pushed by an obstacle to drive the second actuation portion to generate a moving displacement against the floor cleaning apparatus;
    a detection module to detect the swivel displacement of the first actuation portion and the moving displacement of the second actuation portion and output a corresponding first detection signal and a corresponding second detection signal; and
    a control module which is electrically connected to the detection module and receives the first detection signal and the second detection signal to determine whether to trigger the driving wheel set to drive the floor cleaning apparatus to veer,
    wherein the buffer member includes a movable board located in the floor cleaning apparatus and a blocking board located on the movable board, the movable board and the floor cleaning apparatus being interposed by a bracing member to brace the blocking board at a front position in a normal condition,
    wherein the floor cleaning apparatus and the movable board include corresponding holding troughs to hold two ends of the bracing member, and
    wherein the floor cleaning apparatus and the movable board include respectively an insertion portion in the holding troughs to be inserted by the bracing member.

2. The automatic veering structure of claim 1, wherein the floor cleaning apparatus includes a cap corresponding to the wheel rack, the cap including a housing space to hold an elastic element which includes two ends butting the cap and the wheel rack to press the wheel downwards in a normal condition.

3. The automatic veering structure of claim 1, wherein the floor cleaning apparatus includes a holding strut and the movable board includes a movable hole to hold the holding strut.

4. The automatic veering structure of claim 1, wherein the movable board includes an anchor hole and the blocking board includes an anchor strut held in the anchor hole.

5. The automatic veering structure of claim 1, wherein the detection module includes a baseboard which includes a first detector to detect the first actuation portion and a second detector to detect the second actuation portion.

6. The automatic veering structure of claim 5, wherein the first detector and the second detector are optical sensors.

7. The automatic veering structure of claim 1, wherein the control module is a circuit board.

* * * * *